(12) United States Patent
Xu et al.

(10) Patent No.: US 11,663,802 B2
(45) Date of Patent: May 30, 2023

(54) INSECT IDENTIFICATION METHOD AND SYSTEM

(71) Applicant: Hangzhou Glority Software Limited, Hangzhou (CN)

(72) Inventors: Qingsong Xu, Hangzhou (CN); Qing Li, Hangzhou (CN)

(73) Assignee: Hangzhou Glority Software Limited, Hangzhou (CN)

( * ) Notice: Subject to any disclaimer, the term of this patent is extended or adjusted under 35 U.S.C. 154(b) by 0 days.

(21) Appl. No.: 17/767,448

(22) PCT Filed: Sep. 23, 2020

(86) PCT No.: PCT/CN2020/117052
§ 371 (c)(1),
(2) Date: Apr. 8, 2022

(87) PCT Pub. No.: WO2021/068744
PCT Pub. Date: Apr. 15, 2021

(65) Prior Publication Data
US 2022/0358742 A1 Nov. 10, 2022

(30) Foreign Application Priority Data

Oct. 11, 2019 (CN) .......................... 201910964270.7

(51) Int. Cl.
*G06V 10/22* (2022.01)
*G06V 10/74* (2022.01)
*G06V 40/10* (2022.01)

(52) U.S. Cl.
CPC ............ *G06V 10/22* (2022.01); *G06V 10/761* (2022.01); *G06V 40/10* (2022.01)

(58) Field of Classification Search
CPC ...... G06V 10/22; G06V 10/761; G06V 40/10; G06F 16/583
See application file for complete search history.

(56) References Cited

U.S. PATENT DOCUMENTS 10,592,750 B1 * 3/2020 Yavagal ............. H04N 5/23222
11,524,231 B2 * 12/2022 van der Laan ....... H04L 65/403
(Continued)

FOREIGN PATENT DOCUMENTS

| CN | 104624505 | 5/2015 |
|---|---|---|
| CN | 105897735 | 8/2016 |

(Continued)

OTHER PUBLICATIONS

"International Search Report (Form PCT/ISA/210) of PCT/CN2020/117052", dated Dec. 8, 2020, with English translation thereof, pp. 1-4.

(Continued)

*Primary Examiner* — Ming Y Hon
(74) *Attorney, Agent, or Firm* — JCIPRNET

(57) ABSTRACT

Provided in the present disclosure are an insect identification method and system. The system comprises a client and a server, and the client is connected to the server. The method comprises: the client acquires an image photograph that is captured by a target user and that contains an insect to be identified, acquires an insect region in the image photograph, slices the insect region to obtain an insect image, and sends the insect image to the server; the server identifies the insect image by invoking an insect species identification model deployed in the server, and sends the identification result to the client; and the client pushes the identification result to the target user. By applying the solution provided in the present disclosure, the problem in the prior art in which insect identification is very difficult and has low accuracy may be solved.

16 Claims, 3 Drawing Sheets

(56) References Cited

U.S. PATENT DOCUMENTS

| | | | |
|---|---|---|---|
| 2010/0322483 A1* | 12/2010 | Margolis | G06V 10/95 |
| | | | 382/110 |
| 2010/0324997 A1* | 12/2010 | Evans | G06Q 30/02 |
| | | | 705/14.69 |
| 2013/0083974 A1* | 4/2013 | Tsai | G06V 10/50 |
| | | | 382/110 |
| 2018/0225518 A1* | 8/2018 | Gu | G06V 40/10 |
| 2019/0196698 A1* | 6/2019 | Cohen | G06F 16/532 |
| 2020/0065881 A1* | 2/2020 | Truong | G06Q 30/0631 |
| 2020/0094784 A1* | 3/2020 | Herman | B60S 1/0848 |
| 2020/0143202 A1* | 5/2020 | Chellappan | G06K 9/6228 |
| 2020/0242754 A1* | 7/2020 | Peters | G06Q 50/02 |
| 2020/0324465 A1* | 10/2020 | Deruyck | B29C 64/153 |
| 2020/0349397 A1* | 11/2020 | Criswell | B07C 5/02 |
| 2020/0364493 A1* | 11/2020 | Fujiki | G06K 9/629 |
| 2021/0042527 A1* | 2/2021 | Ton-That | G06F 16/951 |
| 2021/0100173 A1* | 4/2021 | Khwaja | A01G 9/247 |
| 2021/0233247 A1* | 7/2021 | Cao | G06N 3/08 |
| 2021/0251209 A1* | 8/2021 | Benedek | A01M 5/00 |
| 2021/0374797 A1* | 12/2021 | Hasan | G06Q 50/01 |
| 2022/0076141 A1* | 3/2022 | Sozzi Sabatini | A01M 7/0089 |
| 2022/0142135 A1* | 5/2022 | Acharya | A01M 1/10 |
| 2022/0279773 A1* | 9/2022 | Lin | G06V 20/52 |
| 2022/0358742 A1* | 11/2022 | Xu | G06V 10/22 |
| 2022/0392757 A1* | 12/2022 | Thakur | G16C 20/20 |

FOREIGN PATENT DOCUMENTS

| | | |
|---|---|---|
| CN | 106127239 | 11/2016 |
| CN | 107729534 | 2/2018 |
| CN | 107784020 | 3/2018 |
| CN | 108875534 | 11/2018 |
| CN | 109215017 | 1/2019 |
| CN | 109447150 | 3/2019 |
| CN | 109449150 | 3/2019 |
| CN | 110674805 | 1/2020 |

OTHER PUBLICATIONS

"Written Opinion of the International Searching Authority (Form PCT/ISA/237) of PCT/CN2020/117052," dated Dec. 8, 2020, pp. 1-5.

"Office Action of China Counterpart Application", dated Oct. 27, 2021, p. 1-p. 10.

* cited by examiner

INSECT IDENTIFICATION METHOD AND SYSTEM

CROSS-REFERENCE TO RELATED APPLICATION

This application is a 371 of international application of PCT application serial no. PCT/CN2020/117052, filed on Sep. 23, 2020, which claims the priority benefits of China Patent Application No. 201910964270.7, filed on Oct. 11, 2019. The entirety of each of the above-mentioned patent applications is hereby incorporated by reference herein and made a part of this specification.

BACKGROUND

Field of the Disclosure

The disclosure relates to the technical field of computer vision, in particular to an insect identification method and system.

Description of Related Art

Nowadays, there is an increasing number of people fond of watching insects in the outdoors. When encountering unknown insect species, people normally identify the insect through an insect identification APP. The current identification process of insect identification APP is that after the client obtains the image photo of the insect provided by the user, the image is compressed and transmitted to the server, and the server uses the insect identification model for recognition. However, in actual applications, image photos of insects are generally taken from a long distance, and the insect itself occupies only a small area of the entire photo. After the image is compressed, the resolution of the insect region will be too low, which increases the difficulty of identification and reduces the identification accuracy.

SUMMARY OF THE DISCLOSURE

Technical Problem

The purpose of the present disclosure is to provide an insect identification method and system to solve the problems in the conventional technology in which insect identification is very difficult and has low accuracy. The specific technical solutions are as follows:

In the first aspect, the present disclosure provides an insect identification method, which is implemented through an insect identification system. The insect identification system includes a client and a server, and the client is connected to the server, and the method includes:

The client acquires an image photo that is captured by a target user and contains an insect to be identified, acquires an insect region in the image photo, slices the insect region to obtain an insect image, and sends the insect image to the server.

The server identifies the insect image by invoking an insect species identification model deployed in the server, and sends the identification result to the client.

The client pushes the identification result to the target user.

Optionally, the method for the client to acquire the insect region from the image photo includes:

The insect region is identified from the image photo through an insect region identification model deployed in the client.

Optionally, the method for the client to acquire the insect region from the image photo includes:

The image photo is compressed, and the compressed image photo is uploaded to the server.

The server identifies the insect region from the compressed image photo through the insect region identification model deployed in the server, and sends the position information of the insect region to the client.

The client determines the insect region from the uncompressed image photo according to the position information of the insect region.

Optionally, the insect region identification model is a neural network model established based on target identification.

Optionally, the identification result includes a plurality of most likely insect species identified by the insect species identification model from the insect image.

The method further includes:

For the multiple most likely insect species, the server selects multiple reference insect images corresponding to each insect species and sends them to the client.

The client pushes the plurality of reference insect images corresponding to each insect species to the target user.

Optionally, the method further includes:

For the plurality of most likely insect species, the server sends attribute information of each insect species to the client.

The client pushes the attribute information of each insect species to the target user.

Optionally, each reference insect image is selected from insect images uploaded by the target user and/or other users.

The method further includes:

For the multiple most likely insect species, the server sends attribute information of each reference insect image to the client.

The client pushes the attribute information of each reference insect image to the target user.

Optionally, the attribute information of the reference insect image includes at least one of uploading user information, capturing time information and capturing location information of the image.

Optionally, after the server identifies and processes the insect image, the method further includes:

The server searches in a preset similar insect database to determine whether the identified insect species exists in the similar insect database; the similar insect database records distinguishing features between similar insect species.

If the identified insect species exists in the similar insect database, the server determines the distinguishing feature between the identified insect species and similar insect species from the similar insect database and sends the distinguishing feature to the client, and the client prompts the target user to capture a portion of the insect to be identified corresponding to the distinguishing feature for secondary identification.

Optionally, one or more of the following operations are performed to determine at least two insect species belong to the similar insect species.

The at least two insect species are common insect species that are easily mistaken.

When a user provides an image of one of the at least two insect species for other users to verify and vote on the one insect species, the number of occurrence of the other insect species among the at least two insect species in the verification and voting results is greater than the threshold; and A test sample set of any one of the at least two insect species is used to test the insect species identification model established by using the training sample set, and the identification result in the test result is that the number of occurrence of the at least two insect species times is greater than the threshold.

Optionally, the insect image further carries capturing time information and/or capturing location information.

After the server performs identification processing on the insect image, the method further includes:

The server screens the identified insect species according to the capturing time information and/or the capturing location information.

Optionally, the server is deployed with insect species identification models corresponding to different regions.

The server invokes the insect species identification model deployed in the server to identify and process the insect image, including:

The server acquires the capturing location information of the insect image, and determines the corresponding insect species identification model according to the capturing location information.

The server invokes the determined insect species identification model to perform identification processing on the insect image.

Optionally, the server pre-records the insect species of interest set by the target user.

The method further includes:

When the server identifies that the insect images uploaded by other users are the insect species of interest to the target user, the server sends the insect images uploaded by other users and the corresponding capturing location information and capturing time information to the client, and the client pushes the insect images uploaded by other users and the corresponding capturing location information and capturing time information to the target user.

Optionally, the insect identification method further includes: the server performs the secondary identification to acquire the species information of the insects to be identified; and The species of insects to be identified is associated with corresponding wallpapers stored in a wallpaper database for use or collection by the target user.

Optionally, the client allows the target user to upload the insect image to a public platform, and the public platform allows the target user to like or comment on the insect images uploaded by himself or other users.

In the second aspect, the present disclosure further provides a system including one or a plurality of processors; and One or a plurality of memories are configured to store a series of computer-executable instructions and computer-accessible data associated with the series of computer-executable instructions.

When being executed by the one or the plurality of processors, the series of computer-executable instructions make the one or the plurality of processors to perform the insect identification methods described in any one of the first aspect.

In the third aspect, the present disclosure further provides a non-transitory computer-readable storage medium storing a series of computer-executable instructions. When being executed by one or a plurality of computing devices, the series of computer-executable instructions make the one or the plurality of computing devices to perform the insect identification method described in any one of the first aspect.

Compared with the conventional technology, the technical solution of the present disclosure has the following advantageous effects:

After the client acquires the image photo of the insect to be identified, the client acquires the insect region in the image photo and slices the insect region to obtain the insect image, and sends the insect image to the server so that the server can perform identification processing. Since the client obtains the insect region in the image photo and slices the insect region to obtain the insect image, the insect image has a smaller amount of data than the original image photo. As a result, the transmission bandwidth and network status requirements may be reduced, and the transmission speed is faster. In the meantime, the insect image has the same resolution relative to the original image photo, which facilitates the subsequent identification processing of the server and makes the identification result more accurate.

BRIEF DESCRIPTION OF THE DRAWINGS

In order to explain the embodiments of the present disclosure or the technical solutions in the prior art more clearly, the following briefly introduces the accompanying drawings that need to be used in the description of the embodiments or the prior art. Clearly, the accompanying drawings in the following description are only some embodiments of the present disclosure. For those of ordinary skill in the art, other drawings can also be obtained from these drawings without creative efforts.

DESCRIPTION OF EMBODIMENTS

The insect identification method and system provided by the present disclosure will be described in further detail below with reference to the accompanying drawings and specific embodiments. The advantages and features of the present disclosure will become more apparent based on the following description. It should be noted that, the accompanying drawings are all in a very simplified form and illustrated in approximate scales, and are only used to facilitate and clearly assist the purpose of explaining the embodiments of the present disclosure.

In order to solve the problem in the conventional technology in which insect identification is very difficult and has low accuracy, embodiments of the present disclosure provide an insect identification method and system.

Figure 1:
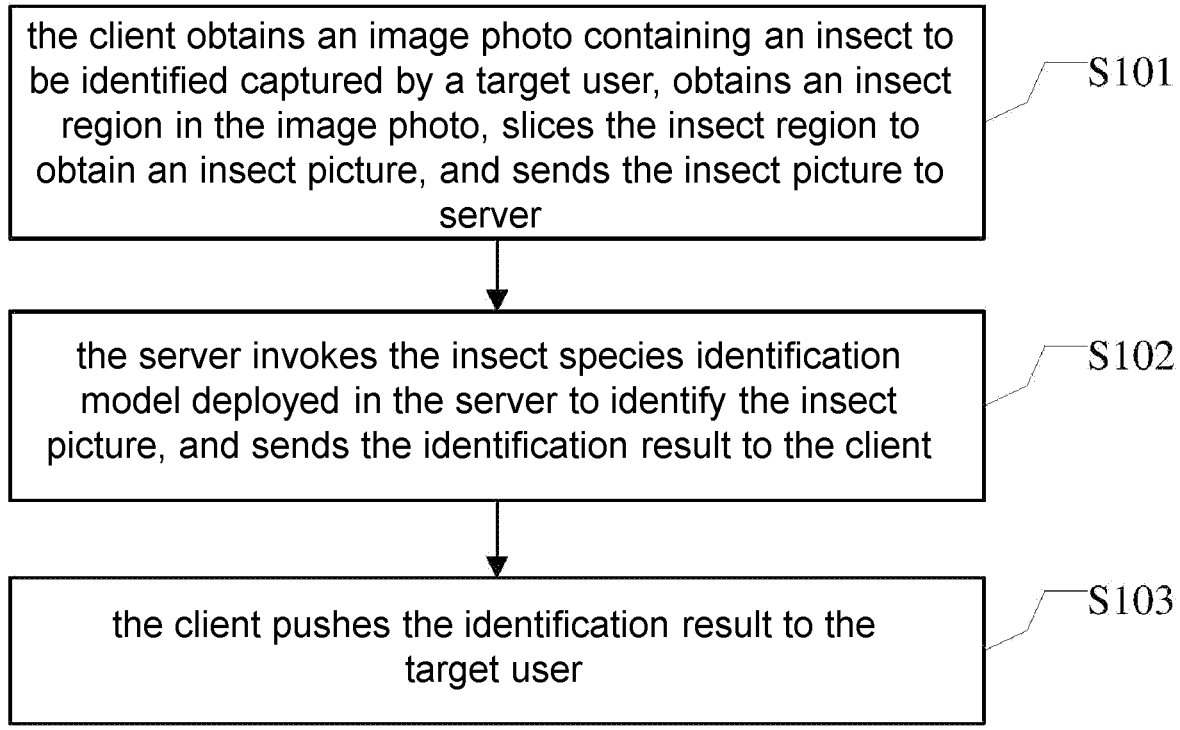
FIG. 1 is a schematic flowchart of an insect identification method provided by an embodiment of the present disclosure.
Figure 2:
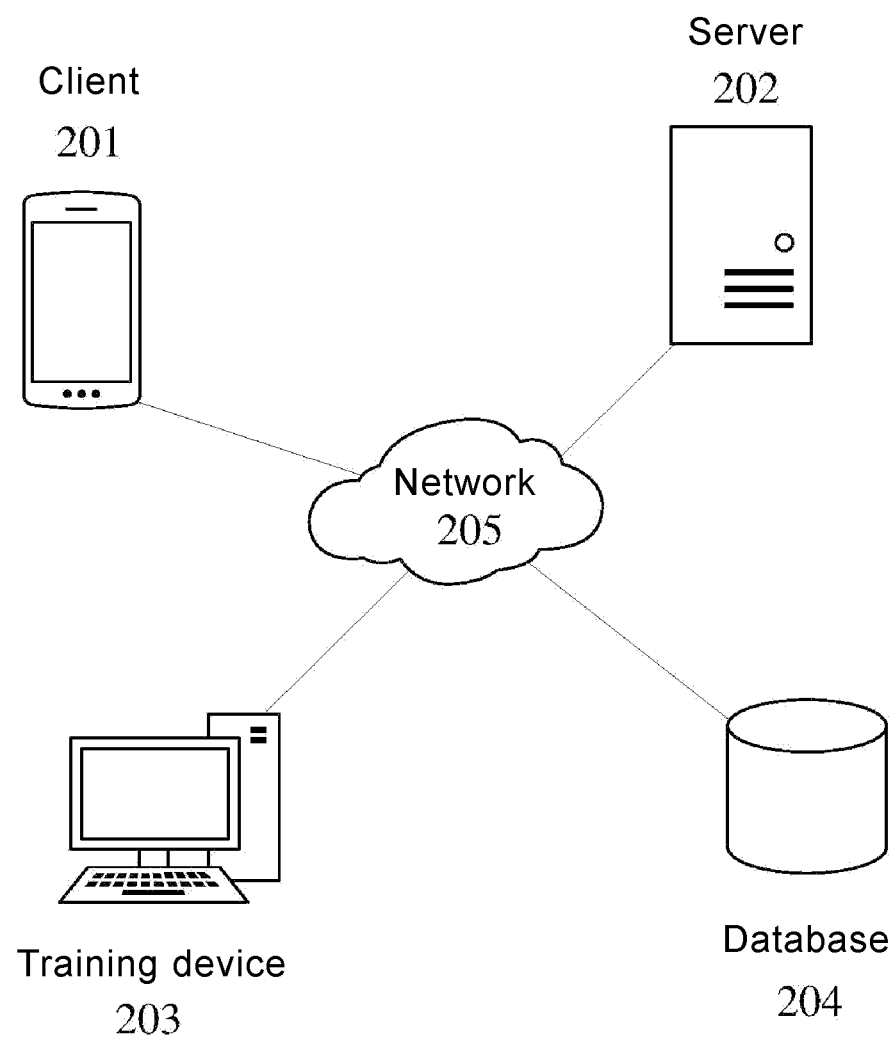
FIG. 2 is a schematic structural view of an insect identification system provided by an embodiment of the present disclosure.

FIG. 1 is a schematic flowchart of an insect identification method provided by an embodiment of the present disclosure. FIG. 2 is a schematic structural view of an insect identification system provided by an embodiment of the present disclosure. The insect identification system includes a client and a server, and the client is connected with the server.

The insect identification method shown in FIG. 1 may be implemented by the insect identification system shown in FIG. 2. Please refer to FIG. 1, an insect identification method may include the following steps:

In step S101, the client obtains an image photo containing an insect to be identified and captured by a target user, obtains an insect region in the image photo, slices the insect region to obtain an insect image, and sends the insect image to server.

In step S102, the server invokes the insect species identification model deployed in the server to identify the insect image, and sends the identification result to the client.

In step S103, the client pushes the identification result to the target user.

In step S101, the image photo may be previously stored by the target user or captured in real time by the target user. The target user may capture an image photo of the insect through a built-in lens of a portable device or an external lens connected with the portable device. The image captured by the user may be a single image or a captured video, and if it is a video, an image may be obtained by obtaining each video frame.

After acquiring the image photo, the client may acquire the insect region in the image photo. In an implementation method, the method for the client to acquire the insect region in the image photo includes: the insect region is identified from the image photo by using an insect region identification model deployed in the client. The client performs an analysis through a pre-established insect region identification model to obtain the region where the insect is located in the image photo, and slices the insect region to obtain an insect image. Thereafter, the client sends the insect image to the server for insect species identification. The insect region is identified and sliced for transmission through the insect region identification model deployed in the client, which may reduce the requirements for transmission bandwidth and network status, improve the transmission speed, while the resolution of insect images is not compressed and reduced, which makes it easy for the server to perform subsequent identification and processing, and the identification result of the server is more accurate.

In another implementation method, the method for the client to obtain the insect region in the image photo includes: the image photo is compressed, and the compressed image photo is uploaded to the server; the server identifies the insect region from the compressed image photo through the insect region identification model deployed in the server, and sends the position information of the insect region to the client; and the client determines the insect region from the uncompressed image photo according to the position information of the insect region. It may be understood that the image photo captured by the user normally has a higher resolution and a larger amount of data, while the client's computing capability is limited. The identification of the insect region by the client is slow, while the processing speed of the server is fast. Therefore, the image photo of the insect is compressed and sent to the server, the server identifies the insect region from the compressed image photo with lower resolution, and then the client slices the original image photo with higher resolution to obtain insect images. In this way, not only that the transmission bandwidth and network status requirements may be reduced, the transmission speed may be improved, but also the identification speed of the insect region may be increased. In the meantime, the resolution of the insect image is not compressed and reduced, which makes it easy for the server to perform subsequent identification process, and the identification result of the server is more accurate.

The insect region identification model is a neural network model established based on object detection, preferably a convolutional neural network model or a mask-rcnn model.

After the insect region identification model identifies the image photo, the insect region is marked with a rectangle, so that the identified insect region can be sliced to form a separate insect image. Since there are usually objects in the background in the image photo obtained by the target user, or there are some regions of other objects around the insect to be identified in the image photo, target identification is adopted, such as the convolutional neural network model or mask-rcnn, etc. are used in order to find the exact region of the insect to be identified in the image photo.

In step S102, the server invokes the insect species identification model deployed in the server to perform identification processing on the insect image to identify the insect species, and the insect species identification model is a neural network model. The above-mentioned neural network may include, for example, a deep convolutional neural network (CNN) or a deep residual network (Resnet). Specifically, the deep convolutional neural network is a deep feedforward neural network, which uses a convolution kernel to scan the insect image, extracts the features to be identified in the insect image, and then identifies the features to be identified in the insect image. In addition, in the process of identifying insect images, the original insect images may be directly input into the deep convolutional neural network model without preprocessing the insect images. Compared with other identification models, the deep convolutional neural network model has higher identification accuracy and identification efficiency. Compared with the deep convolutional neural network model, the deep residual network model is added with an identity mapping layer, which may avoid the saturation or even decline of the accuracy caused by the convolutional neural network as the network depth (the number of layers in the network) increases. The identity mapping function of the identity mapping layer in the residual network model needs to satisfy: the sum of the identity mapping function and the input of the residual network model is equal to the output of the residual network model. After identity mapping is introduced, the change in the output of the residual network model is more obvious, so the identification accuracy and identification efficiency of insect feature identification may be remarkably improved. In this manner, the identification accuracy and identification efficiency of insects may be enhanced.

In actual applications, the identification result output by the insect species identification model may include one or a plurality of insect species, and there are possibilities for the plurality of insect species respectively. The server may sort out the plurality of possible insect species information in a descending manner according to the possibility in the identification result.

Specifically, in an implementation method, the identification result includes a plurality of most likely insect species identified by the insect species identification model on the insect image. Therefore, for plurality of most likely insect species, the server may select multiple reference insect images corresponding to each insect species and send the reference insect images to the client. The client pushes the multiple reference insect images corresponding to each insect species to the target user. Moreover, the server may further send the attribute information of each insect species to the client, so that the client pushes the attribute information of each insect species to the target user. The attribute information of the insects may include: classification information, basic feature information, habit information, atlas photos of insects and so on. Multiple reference insect images of each insect species are selected and pushed to the target user, so as to show the different morphology and angles of each insect species. Each reference insect image may be selected from the insect images uploaded by the target user and/or other users. In the meantime, the server may further send the attribute information of each reference insect image to the client, and the client pushes the attribute information of each reference insect image to the target user. The attribute information of the reference insect image may include: uploading user information, capturing time information, and capturing location information of the image and so on, so that the target user may view the uploading user information, capturing time information, and capturing location information of the reference insect image.

Furthermore, in order to improve the accuracy of insect identification, a similar insect database may also be managed and maintained. The similar insect database is pre-recorded with distinguishing features between similar insect species, and the target user is prompted to perform a secondary identification of easily mistaken similar insects according to the distinguishing features between similar insect species, so as to obtain a more accurate identification result. Specifically, in step S102, after the server performs the identification process on the insect image to obtain the identification result, the server may further perform a search in a preset similar insect database to determine whether the identified insect species exists in the similar insect database. If the result is positive, the server determines the distinguishing feature between the identified insect species and the similar insect species from the similar insect database and sends the distinguishing feature to the client, and the client prompts the target user to capture the portion of the insect to be identified with the distinguishing feature to perform the secondary identification. The prompt information may be displayed in any one of text, image or combination of images and text, and may also be in the form of video explanation.

For example, butterflies and moths belong to similar insect species that are commonly seen, and locusts, grasshoppers, crickets, and katydids also belong to similar insect species. These two groups of similar insect species may be recorded in the similar insect database, and the distinguishing features between each group of the similar insect species are also recorded. For example, the similar insect database records the distinguishing features between butterflies and moths as follows: the antennae of butterflies are mostly rod-shaped, and the tips of their antennae are swollen like a matchstick; the antennae of moths are mostly filamentous, feathery, and comb-toothed; butterflies often raise their wings vertically up behind their back when they are resting, while the moths hang their wings down to cover their abdomen in a tent-like manner. After the server identifies an insect image, and the identification result is that the species of the insect is a butterfly, it may be determined by searching in the similar insect database that the insect species exists in the similar insect database. That is, there are other similar insect species, namely, moths. Under the circumstances, the server obtains the distinguishing feature between butterflies and moths from the similar insect database, and pushes the distinguishing feature to the user through the client, prompting the user to capture the portion with the distinguishing feature (i.e., focus on capturing the antennae or wings of insects) to perform a secondary identification, in order to accurately identify whether the insect is a butterfly or a moth. In this way, the secondary identification of the portion with the distinguishing feature makes it possible to avoid mistaking one insect with another similar insect species, and improve the accuracy of insect species identification.

Confounding insect species may include at least two breeds of the same species, or at least two species, and one or more of the following methods may be used to determine that multiple insect species belong to confusingly similar insect species.

For example, in the first method, it may be determined that multiple insect species belong to the common insect species that are easily mistaken. For example, according to common sense, butterflies and moths are common insect species that are easily mistaken, and locusts, grasshoppers, crickets, and katydids are also common insect species that are easily mistaken.

In the second method, the judgment may be made according to the verification and voting functions built in the application of the client. For example, when the user is not sure about the identification result of a certain insect, the user may initiate a verification or voting within the application, which includes candidate options covering multiple insect species, and the candidate options may be user-defined or automatically selected by the system. When the number of occurrences of certain candidate options in the verification or voting results reaches a threshold, the system regards these candidate options as insect species that are easily mistaken. In an example, three candidate options are included in the verification or voting: butterfly, moth, and cicada. A total of 500 valid feedback results were received, and the number of occurrences of butterflies, moths and cicadas was 250, 200 and 50 respectively, and the threshold was 100 (the threshold may be preset or calculated according to the number of valid feedback results obtained (such as a threshold proportional to the number of valid feedback results)). Therefore, butterflies and moths were identified as insect species that are easily mistaken.

In the third method, it may be determined that multiple insect species belong to the insect species that are easily mistaken according to intermediate results when training the identification model. For example, the system establishes an insect species identification model through a training sample set, and the insect species identification model is tested by using a test sample set. When the number of occurrences of multiple insect species in the test result is greater than the threshold, it is determined that the multiple insect species belong to insect species that are easily mistaken. For example, there are many breeds of butterflies, such as white butterflies, nymphs, swallowtails, etc. A test sample set containing 1,000 images of white butterflies was sent to the insect species identification model for identification testing. The test results showed that 500 images were white butterflies, 300 images were nymphs, 100 images were swallowtails, and 100 images were other similar insects. The threshold was set to 200 (the threshold may be preset or calculated according to the number of valid test results (such as a threshold proportional to the number of valid test results)), and it was determined that white butterflies and nymphs are insect species that are easily mistaken.

Further, during the identification of insect species, unlikely insect species may be excluded according to information such as region and season, so as to further improve the accuracy of identification. Specifically, the insect image also carries capturing time information and/or capturing location information, and after the server performs identification processing on the insect image, the method further includes: the server screens the identified insect species according to the capturing time information and/or capturing location information. That is, when acquiring the image photo of the insect to be identified, the client simultaneously acquires and records the location information and time information when the target user captures the image photo, and the location information includes but is not limited to GPS information. For example, if the identification result of a certain insect image includes multiple most likely insect species, one of the insect species was cicada, and the insect image was captured in December (cicadas are unlikely to be seen in December), and therefore cicadas and the same insect species may be excluded according to the capturing time.

In addition, the server may further store the insect image in the sample library of the insect species, record the location information, date information and time information of the image during storage, and also record the physiological cycle information and morphology information corresponding to the insect species at the current location for users to use subsequently.

In actual applications, the common important insect species may also be counted by region. Different common insect species are found in different regions, and intensive training may be carried out for these common species to obtain insect species identification models corresponding to different regions. The insect species identification model may include a plurality of insect species identification models categorized by geographic regions. For example, geographic regions may be categorized according to larger regions such as North America, East Asia, and Europe, or according to smaller regions such as China's Yangtze River Delta, Pearl River Delta, and Northwest China.

Specifically, the insect species identification models corresponding to different regions are pre-deployed in the server; the server invokes the insect species identification model deployed in the server to identify and process the insect images. The method includes: the server obtains the capturing location information of the insect image, and determines the corresponding insect species identification model according to the capturing location information; the server invokes the determined insect species identification model to identify and process the insect image. Different insect species identification models are invoked according to the location information of insect images. For example, the insect species identification models in the United States and China are different insect species identification models respectively established and trained by using different insect species samples from their respective geographic regions.

Further, after step S103, if the user is not sure about the identification result, the insect image may further be uploaded for voting and verification. In the meantime, a plurality of possible insect species in the identification result are provided as options or user-defined options are provided to other users for voting and verification.

In addition, in order to improve the user experience, the target user may further collect the insect species that the target user is interested in, so that the server pre-records the insect species of interest set by the target user. When the server identifies that the insect images uploaded by other users are the insect species that the target user is interested in, the server sends the insect images uploaded by other users and the corresponding capturing locations and capturing time information to the client, and the client pushes the insect images uploaded by other users and the corresponding capturing locations and capturing time information to the target user. After the target user collects the insect species he is interested in, when there are other users nearby who capture and upload insect images of the same type, the target user may be reminded to view the images captured by other users and related location and time information, or they may choose to see the distribution information of a certain insect species on the map, or select a certain region to see what insect species are captured by users in this region, or view insects around the world in the world map.

It is also possible to manage a wallpaper database in which a large number of insect wallpaper images are stored, and each wallpaper image may be classified according to insect species. After identifying the insect species, the server may further associate the insect species with the corresponding wallpaper stored in the wallpaper database for the user to use or collect. The client may further allow the target user to upload the insect image to a public platform, and the public platform allows the target user to like or comment on the insect image uploaded by himself or other users. The server may further count and rank the number of insect images uploaded by users, and publish a worldwide ranking list, so as to improve the interest and interactivity of insect identification.

The training of the insect region identification model and the insect species identification model will be described below. The insect region identification model and the insect species identification model may be obtained by training the corresponding neural network using a training sample set including a large number of insect images.

In an embodiment, the insect region identification model/insect species identification model may be established based on training a neural network, and the training process is as follows:

A certain number of image samples marked with corresponding information are obtained for each insect species, and the number of image samples prepared for each insect species may be the same or different. Corresponding information marked for each image sample may include the region where the insect in the image sample is located and the insect name (including scientific name, alias, category name for zoological classification, etc.). The image samples acquired for each insect species may include, as far as possible, images containing different angles of the species of insects, different illumination conditions, different seasons (e.g., the same insect may have different morphologies in different seasons), different times (e.g., the same insect may have different morphologies in the mornings and at nights), different growth environments (for example, the same insect may grow with different morphologies on land and in water), and different geographic locations (for example, the same insect may grow with different morphologies in different geographic locations). In these cases, the corresponding information marked for each image sample may further include information such as angle, illumination, season, time, growth environment, geographic location, and the like of the image sample.

The image samples that have undergone the above marking processing are categorized into a training sample set for training the insect region identification model/insect species identification model and a test sample set for testing the training results. Typically, the number of samples in the training sample set is significantly greater than the number of samples in the test sample set. For example, the number of samples in the test sample set accounts for 5% to 20% of the total number of image samples, and the number of samples in the corresponding training sample set accounts for 80% to 95% of the total number of image samples. It should be understood by those skilled in the art that the number of samples in the training sample set and the test sample set may be adjusted as required.

The training sample set is used to train the neural network, and the test sample set is used to test the output accuracy of the trained neural network. If the output accuracy does not meet the requirements, the number of image samples in the training sample set is increased, and the updated training sample set is used to retrain the neural network until the output accuracy of the trained neural network meets the requirements. If the output accuracy meets the requirements, the training is over. In this way, the trained neural network whose output accuracy meets the requirements may be used as the trained insect region identification model/insect species identification model.

To sum up, in the insect identification method provided by this embodiment, after the client obtains the image photo of the insect to be identified, the client obtains the insect region in the image photo and slices the insect region to obtain the insect image, and sends the insect image to the server so that the server can identify the insect image. Since the client obtains the insect images from the slices of the image photo, the insect image has a smaller amount data than the original image photo, so the requirements for transmission bandwidth and network status may be reduced, and the transmission speed is faster. Moreover, the resolution of insect images remains unchanged relative to the original image photo, which makes it easy for the server to perform identification processing in the later stage and makes the identification result more accurate.

Please refer to FIG. 2. FIG. 2 is a schematic structural view of an insect identification system provided by an embodiment of the present disclosure. An insect identification system may include: a client 201, a server 202, a training device 203 and a database 204, which are coupled together through a network 205 in a wired or wireless manner.

The client 201 is configured to obtain an image photo containing an insect to be identified and captured by a target user, obtain an insect region in the image photo, slice the insect region to obtain an insect image, and send the insect image to the server 202.

The server 202 is configured to invoke the insect species identification model deployed in the server to identify the insect image, and send the identification result to the client 201.

The client 201 is further configured to push the identification result to the target user.

Optionally, the client 201 is specifically configured to identify the insect region from the image photo by using the insect region identification model deployed in the client 201.

Optionally, the client 201 is specifically configured to compress the image photo, and upload the compressed image photo to the server 202.

The server 202 is specifically configured to identify the insect region from the compressed image photo through the insect region identification model deployed in the server 202, and send the position information of the insect region to the client 201.

The client 201 is specifically configured to determine the insect region from the uncompressed image photo according to the position information of the insect region.

Optionally, the insect region identification model is a neural network model established based on target identification.

Optionally, the identification result includes a plurality of most likely insect species identified by the insect species identification model from the insect photo.

The server 202 is specifically configured to, based on the plurality of most likely insect species, select a plurality of reference insect images corresponding to each insect species and send the reference insect images to the client 201.

The client 201 is specifically configured to push the plurality of reference insect images corresponding to each insect species to the target user.

Optionally, the server 202 is further configured to, based on the plurality of most likely insect species, send attribute information of each insect species to the client 201.

The client 201 is further configured to push the attribute information of each insect species to the target user.

Optionally, each reference insect image is selected from insect images uploaded by the target user and/or other users.

The server 202 is further configured to, based on the plurality of most likely insect species, send attribute information of each reference insect image to the client 201.

The client 201 is further configured to push the attribute information of each reference insect image to the target user.

Optionally, the server 202 is further configured to perform a search in a preset similar insect database after identifying the insect image, and determine whether the identified insect species exists in the similar insect database. The similar insect database records distinguishing features between similar insect species. If the determining result is positive, the distinguishing features between the identified insect species and similar insect species are determined from the similar insect database and sent to the client 201.

The client 201 is further configured to prompt the target user to capture the portion of the insect to be identified with the distinguishing feature for secondary identification.

Optionally, one or more of the following operations are performed to determine at least two insect species belong to the similar insect species.

The at least two insect species are common insect species that are easily mistaken.

When a user provides an image of one of the at least two insect species for other users to verify and vote on the one insect species, the number of occurrence of the other insect species among the at least two insect species in the verification and voting results is greater than the threshold; and A test sample set of any one of the at least two insect species is used to test the insect species identification model established by using the training sample set, and the identification result in the test result is that the number of occurrence of the at least two insect species times is greater than the threshold.

Optionally, the insect image further carries capturing time information and/or capturing location information.

The server 202 is further configured to screen the identified insect species according to the capturing time information and/or the capturing location information after identifying and processing the insect image.

Optionally, the server 202 is deployed with insect species identification models corresponding to different regions.

The server 202 is specifically configured to acquire the capturing location information of the insect image, determine the corresponding insect species identification model according to the capturing location information, and invoke the determined insect species identification model to identify and process the insect image.

Optionally, the server 202 pre-records the insect species of interest set by the target user.

The server 202 is further configured to, when the server identifies that the insect images uploaded by other users are the insect species of interest to the target user, the server sends the insect images uploaded by other users and the corresponding capturing location information and capturing time information to the client 201.

The client 201 is further configured to push the insect images uploaded by other users and the corresponding capturing location information and capturing time information to the target user.

Optionally, the server 202 is further configured to perform the secondary identification to acquire the species information of the insects to be identified, and the species of insects to be identified is associated with corresponding wallpapers stored in a wallpaper database for use or collection by the target user.

Optionally, the client 201 allows the target user to upload the insect image to a public platform, and the public platform allows the target user to like or comment on the insect images uploaded by himself or other users.

In the insect identification system provided by the embodiment, after the client acquires the image photo of the insect to be identified, the client acquires the insect region in the image photo and slices the insect region to obtain the insect image, and sends the insect image to the server so that the server can perform identification processing. Since the client obtains the insect region in the image photo and slices the insect region to obtain the insect image, the insect image has a smaller amount of data than the original image photo. As a result, the transmission bandwidth and network status requirements may be reduced, and the transmission speed is faster. In the meantime, the insect image has the same resolution relative to the original image photo, which facilitates the subsequent identification processing of the server and makes the identification result more accurate.

In the insect identification system, the network 205 may be embodied as a wide area network (such as a mobile phone network, a public switched telephone network, a satellite network, the Internet, etc.), a local area network (such as Wi-Fi, Wi-Max, ZigBee™, Bluetooth™, etc.) and/or or other forms of networking capabilities.

The client 201 may be a mobile phone, a tablet computer, a laptop computer, a personal digital assistant, and/or other computing devices configured to capture, store, and/or transmit images such as digital photographs. Accordingly, the client 201 may include an image capturing device such as a digital camera and/or may be configured to receive images from other devices. The client 201 may include a display. The display may be configured to provide a user with one or a plurality of user interfaces, which may include a plurality of interface elements, with which the user may interact, and the like. For example, a user may use the client 201 to take images of insects and upload or store the images. The client 201 may output information on the species of insects and the like to the user.

A training device 203 may be coupled to the network 205 to facilitate the training of an insect region identification model and an insect species identification model. The training device 203 may have multiple CPUs and/or GPUs to assist in training the insect region recognition model and the insect species recognition model.

A database 204 (including a similar insects database and a wallpaper database) may be coupled to the network 205 and provide the data required by the server 202 to perform the relevant calculations. The database 204 may be implemented by using various database techniques known in the art. The server 202 may access the database 204 for relevant operations as needed.

Figure 3:
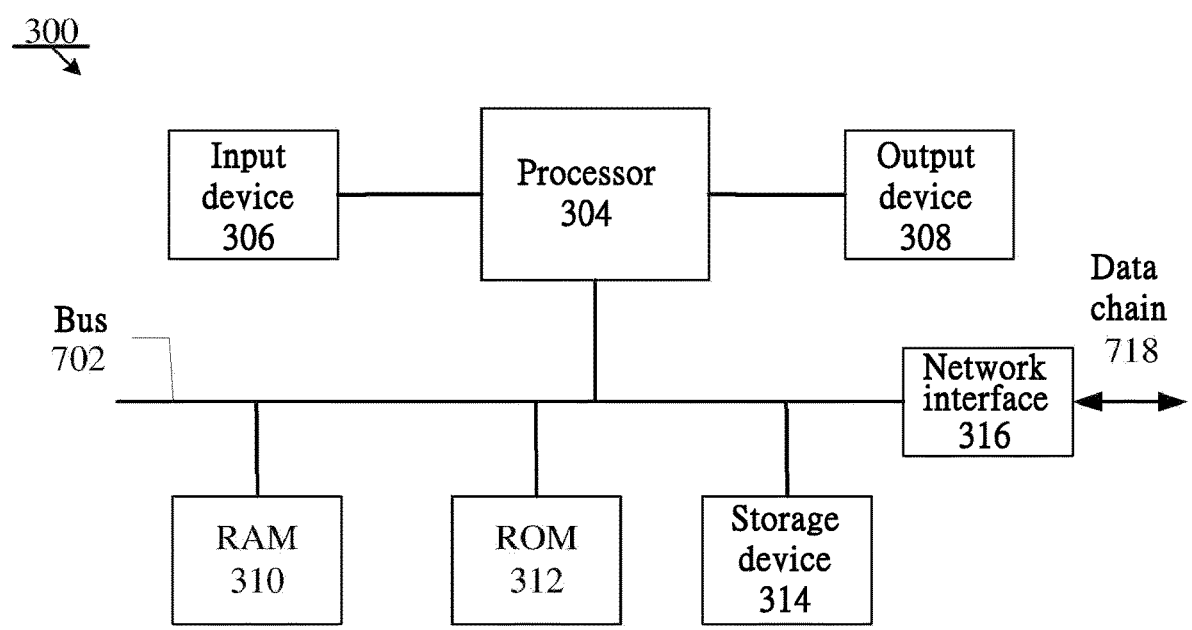
FIG. 3 is an exemplary configuration diagram of a computing device provided by an embodiment of the present disclosure.

FIG. 3 illustrates an exemplary configuration of a computing device 300 in which embodiments in accordance with the present disclosure may be implemented. The computing device 300 is an example of a hardware device to which the above-described aspects of the present disclosure may be applied. The computing device 300 may be any machine configured to perform processing and/or computation. The computing device 300 may be, but is not limited to, a workstation, a server, a desktop computer, a laptop computer, a tablet computer, a personal data assistant (PDA), a smartphone, a vehicle-mounted computer, or a combination of the above.

As shown in FIG. 3, the computing device 300 may include one or a plurality of elements that may connect or communicate with bus 302 through one or a plurality of interfaces. The bus 302 may include, but is not limited to, an Industry Standard Architecture (ISA) bus, a Micro Channel Architecture (MCA) bus, an Enhanced ISA (EISA) bus, a Video Electronics Standards Association (VESA) local bus, and a Peripheral Component Interconnect (PCI) bus, etc. The computing device 300 may include, for example, one or a plurality of processors 304, one or a plurality of input devices 306, and one or a plurality of output devices 308. The one or a plurality of processors 304 may be any kind of processors, and may include, but are not limited to, one or a plurality of general-purpose processors or special-purpose processors (such as special-purpose processing chips). The input device 306 may be any type of input device capable of inputting information to a computing device, and may include, but is not limited to, a mouse, a keyboard, a touch screen, a microphone, and/or a remote controller. The output device 308 may be any type of device capable of presenting information, and may include, but is not limited to, displays, speakers, video/audio output terminals, vibrators, and/or printers.

The computing device 300 may also include or be connected to non-transitory storage device 314, which may be any storage device that is non-transitory and may enable data storage, and may include, but is not limited to, disk drives, optical storage device, solid state memory, floppy disk, flexible disk, hard disk, magnetic tape or any other magnetic medium, compact disk or any other optical medium, cache memory and/or any other memory chip or module, and/or any other medium from which a computer can read data, instructions and/or code. The computing device 300 may further include a random access memory (RAM) 310 and a read-only memory (ROM) 312. The ROM 312 may store programs, utilities or processes to be executed in a non-volatile manner. The RAM 310 may store volatile data and store instructions related to the operation of the computing device 300. The computing device 300 may further include a network/bus interface 316 coupled to the data chain 318. The network/bus interface 316 may be any kind of device or system capable of enabling communication with external devices and/or networks, and may include, but is not limited to, modems, network cards, infrared communication devices, wireless communication devices, and/or chipsets (such as Bluetooth™ devices, 1302.11 devices, WiFi devices, WiMax devices, cellular communication facilities, etc.).

Various aspects, embodiments, implementations or features of the foregoing embodiments may be used alone or in any combination. Various aspects of the foregoing embodiments may be implemented in software, hardware, or a combination of hardware and software.

For example, the foregoing embodiments may be embodied as computer-readable code on a computer-readable medium. A computer-readable medium is any data storage device that can store data which can be read by a computer system afterwards. Examples of computer-readable media include read-only memory, random-access memory, CD-ROMs, DVDs, magnetic tapes, hard drives, solid-state drives, and optical data storage devices. The computer readable medium may also be distributed over computer systems coupled the network so that the computer readable code is stored and executed in a distributed manner.

For example, the foregoing implementations may take the form of hardware circuits. Hardware circuits may include any combination of combinational logic circuits, clock storage devices (such as floppy disks, flip-flops, latches, etc.), finite state machines, memories such as static random access memory or embedded dynamic random access memory, custom designed circuits, programmable logic arrays, etc.

It should be noted that various embodiments in this specification are described in a related manner, and the same and similar parts between the various embodiments can serve as cross-reference for each other, and each embodiment focuses on the differences from other embodiments. In particular, as for the system embodiments, since they are basically similar to the method embodiments, the description is relatively simple, and for related parts, please refer to the related descriptions in the method embodiments.

In this specification, relational terms such as first and second, etc. are used only to distinguish one entity or operation from another entity or operation, and do not necessarily require or imply any such existence of the actual relationship or sequence between these entities or operations. Moreover, the terms "comprising", "including" or any other variation thereof are intended to encompass a non-exclusive inclusion such that a process, method, article or device comprising a list of elements includes not only those elements, but also includes not explicitly listed or other elements inherent to such a process, method, article or apparatus. In the case where there is no further limitation, an element defined by the phrase "comprising a . . . " does not preclude the presence of additional identical elements in a process, method, article or apparatus that includes the element.

The above description is only a description of the preferred embodiments of the present disclosure, and is not intended to limit the scope of the present disclosure. Any changes and modifications made by those of ordinary skill in the field of the present disclosure based on the above disclosure all belong to the scope to be protected by the claims.

What is claimed is:

1. An insect identification method, which is realized through an insect identification system, wherein the insect identification system comprises a client and a server, the client is connected to the server, and the method comprising:
   acquiring, by the client, an image photo that is captured by a target user and that contains an insect, which is to be identified, acquiring an insect region in the image photo, slicing the insect region to obtain an insect image, and sending the insect image to the server;
   identifying, by the server, the insect image by invoking an insect species identification model deployed in the server, and sending an identification result to the client;
   pushing, by the client, the identification result to the target user;
   wherein the method for the client to acquire the insect region from the image photo comprises:
   compressing the image photo, and uploading the image photo, which is compressed, to the server, and then determining, by the client, the insect region from an uncompressed image photo according to position information of the insect region in the image photo, wherein the position information of the insect region refer to pixel location of the insect region in the image photo.

2. The insect identification method according to claim 1, wherein the method for the client to acquire the insect region from the image photo comprises:
   identifying the insect region from the image photo through an insect region identification model deployed in the client.

3. The insect identification method according to claim 2, wherein the insect region identification model is a neural network model established based on target identification.

4. The insect identification method according to claim 1, wherein the method for the client to acquire the insect region from the image photo further comprises:
   identifying, by the server, the insect region from the image photo, which is compressed, through an insect region identification model deployed in the server, and sending position information of the insect region to the client.

5. The insect identification method according to claim 1, wherein the identification result comprises a plurality of most likely insect species identified by the insect species identification model from the insect image;
   the method further comprising:
   for the plurality of most likely insect species, selecting, by the server, a plurality of reference insect images corresponding to each of an insect species and sending the plurality of reference insect images to the client;
   pushing, by the client, the plurality of reference insect images corresponding to each of the insect species to the target user.

6. The insect identification method according to claim 5, wherein the method further comprises:
   for the plurality of most likely insect species, sending, by the server, attribute information of each of the insect species to the client;
   pushing, by the client, the attribute information of each of the insect species to the target user.

7. The insect identification method according to claim 5, wherein each of the reference insect images is selected from uploaded insect images, which are uploaded by the target user and/or other users;
   the method further comprising:
   for the plurality of most likely insect species, sending, by the server, attribute information of each of the reference insect images to the client;
   pushing, by the client, the attribute information of each of the reference insect images to the target user.

8. The insect identification method according to claim 1, wherein after the server identifies and processes the insect image, the method further comprises:
   searching, by the server, in a similar insect database, which is preset, to determine whether an identified insect species exists in the similar insect database, wherein the similar insect database records distinguishing features between a plurality of similar insect species;
   if the identified insect species exists in the similar insect database, the server determines the distinguishing features between the identified insect species and the similar insect species from the similar insect database and sends the distinguishing features to the client, and the client prompts the target user to capture a portion of the insect, which is to be identified, corresponding to the distinguishing features for a secondary identification.

9. The insect identification method according to claim 8, wherein one or more of the following operations are performed to determine at least two of the insect species belong to the similar insect species:
- the at least two of the insect species are common insect species that are easily mistaken;
- when a user provides an image of one of the at least two of the insect species for other users to verify and vote on the one of the insect species, a number of occurrence of other insect species among the at least two of the insect species in verification and voting results is greater than a threshold; and
- a test sample set of any one of the at least two of the insect species is used to test the insect species identification model established by using a training sample set, and the identification result in a test result is that the number of occurrence of at least two insect species times is greater than the threshold.

10. The insect identification method according to claim 8, wherein the insect identification method further comprises: performing, by the server, the secondary identification to acquire species information of the insect, which is to be identified; and
- the species of insect, which is to be identified, is associated with corresponding wallpapers stored in a wallpaper database for use or collection by the target user.

11. The insect identification method according to claim 1, wherein the insect image further carries capturing time information and/or capturing location information;
after the server performs identification processing on the insect image, the method further comprising:
- screening, by the server, a plurality of identified insect species according to the capturing time information and/or the capturing location information.

12. The insect identification method according to claim 1, wherein the server is deployed with corresponding insect species identification models, which are corresponding to different regions;
the server invokes the corresponding insect species identification models deployed in the server to identify and process the insect image, comprising the following steps:
- acquiring, by the server, capturing location information of the insect image, and determining the corresponding insect species identification models according to the capturing location information;
- invoking, by the server, the corresponding insect species identification models, which are determined, to perform identification processing on the insect image.

13. The insect identification method according to claim 1, wherein the server pre-records a plurality of insect species of interest, which are set by the target user;
the method further comprising:
- when the server identifies that uploaded insect images, which are uploaded by other users, are the plurality of insect species of interest to the target user, the server sends the uploaded insect images, which are uploaded by the other users, and corresponding capturing location information and corresponding capturing time information to the client, and the client pushes the uploaded insect images, which are uploaded by the other users, and the corresponding capturing location information and the corresponding capturing time information to the target user.

14. The insect identification method according to claim 1, wherein the client allows the target user to upload the insect image to a public platform, and the public platform allows the target user to like or comment on uploaded insect images, which are uploaded by himself or other users.

15. A system, comprising:
- one or a plurality of processors; and
- one or a plurality of memories, which are configured to store a series of computer-executable instructions and computer-accessible data associated with the series of computer-executable instructions,
- wherein when being executed by the one or the plurality of processors, the series of computer-executable instructions make the one or the plurality of processors to perform the insect identification method claimed in claim 1.

16. A non-transitory computer-readable storage medium, which stores a series of computer-executable instructions, wherein when being executed by one or a plurality of computing devices, the series of computer-executable instructions make the one or the plurality of computing devices to perform the insect identification method claimed in claim 1.

* * * * *